C. L. Fehrensen,
Atomizer.
No. 101,848.    Patented Apr. 12, 1870.
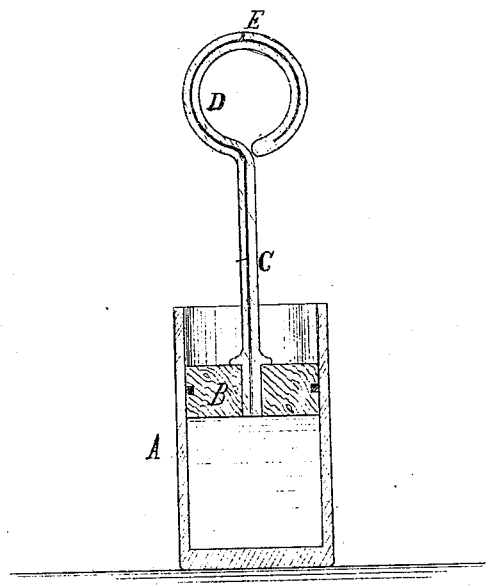
Witnesses:
C. Wahlers
E. F. Kastenhuber
Inventor:
C. L. Fehrensen
pr
Van Santvoord & Hauff
attys

United States Patent Office.

CHRISTIAN L. FEHRENSEN, OF NEW YORK, N. Y.

Letters Patent No. 101,848, dated April 12, 1870.

IMPROVED PERFUME EJECTOR.

The Schedule referred to in these Letters Patent and making part of the same

*To all whom it may concern:*

Be it known that I, CHRISTIAN L. FEHRENSEN, of the city, county, and State of New York, have invented a new and improved Perfume Ejector; and I do hereby declare the following to be a full, clear, and exact description thereof, which will enable those skilled in the art to make and use the same, reference being had to the accompanying drawing forming part of this specification, in which drawing, consisting of one figure, I represent a vertical central section of my invention.

This invention relates to articles for containing liquid perfumes, and consists in a vessel provided with a sliding perforated stopper or piston and hollow stem, in such a manner that when the stopper is pushed into the vessel, the perfume will be ejected through the stopper and hollow stem, and discharged upon the article or place toward which it is directed, the end of the hollow stem being bent so as to form a handle by which the stopper is operated.

In the example of my invention here shown, the vessel and the stem are of glass, and the stopper of cork; but I do not confine myself to any particular material.

The letter A designates a vessel for containing perfume, and B is a stopper fitted in it tight enough to prevent the contents from being accidentally spilled out.

The stopper is hollow, or has a perforation through it which communicates with a hollow stem, C, which rises from it and extends beyond the top of the vessel, where it is bent over to form a hollow curved handle or ring, D, which I perforate at E on its top, so that any liquid which is forced through the stem and handle, will be ejected from the orifice E and discharged upon any article properly presented to it, which it is desired to charge with the perfume.

In operating my ejector I hold the vessel in the hand, and, passing a finger through the ring or handle D, I press the stopper against the liquid, and thereby cause the latter to rise up through the stopper and stem, and pass around into the handle, when it is ejected, as above explained.

What I claim as new, and desire to secure by Letters Patent, is—

The perfume-ejector above shown, consisting of a vessel, A, perforated stopper B, and hollow stem C, whose end terminates in a ring or handle having an ejection-orifice, E, the said parts being combined and arranged substantially as described.

This specification signed by me this 2d day of February, 1870.

CHRISTIAN L. FEHRENSEN.

Witnesses:
C. WAHLERS,
E. F. KASTENHUBER.